US008198888B2

(12) United States Patent
Grömmer et al.

(10) Patent No.: US 8,198,888 B2
(45) Date of Patent: Jun. 12, 2012

(54) METHOD AND SYSTEM FOR DETERMINING THE DISTANCE BETWEEN A PROFILED SURFACE AND A FUNCTIONAL SURFACE MOVING IN RELATION THERETO BY USING MEASUREMENT COILS AND A REFERENCE COIL

(75) Inventors: Werner Grömmer, Ortenburg/Kaltenöd (DE); Felix Mednikov, Ortenburg (DE); Robert Schmid, Neunkirchen am Brand (DE); Martin Sellen, Ortenburg (DE); Benno Weis, Hemhofen (DE)

(73) Assignees: Siemens Aktiengesellschaft, Munich (DE); Micro-Epsilon Messtechnik GmbH & Co. KG, Ortenburg (DE)

( * ) Notice: Subject to any disclaimer, the term of this patent is extended or adjusted under 35 U.S.C. 154(b) by 875 days.

(21) Appl. No.: 11/664,793

(22) PCT Filed: Sep. 29, 2005

(86) PCT No.: PCT/EP2005/054927
§ 371 (c)(1),
(2), (4) Date: Nov. 19, 2008

(87) PCT Pub. No.: WO2006/040267
PCT Pub. Date: Apr. 20, 2006

(65) Prior Publication Data
US 2009/0072820 A1    Mar. 19, 2009

(30) Foreign Application Priority Data
Oct. 8, 2004   (DE) .................. 10 2004 049 753

(51) Int. Cl.
*G01B 7/14*      (2006.01)
(52) U.S. Cl. ............... 324/207.16; 324/207.26; 324/232

(58) Field of Classification Search ............ 324/207.17–324/207.26, 228, 232, 236, 242–243
See application file for complete search history.

(56) References Cited

U.S. PATENT DOCUMENTS 4,812,757 A    3/1989 Meins et al.
(Continued)

FOREIGN PATENT DOCUMENTS

DE    25 03 560    8/1976
(Continued)

*Primary Examiner* — Jay Patidar
(74) *Attorney, Agent, or Firm* — Harness, Dickey & Pierce, P.L.C.

(57) ABSTRACT

In one embodiment, a method for determining the distance of a conducting surface profiled in a direction of distance determination from a functional surface moving relative to the profiled surface is disclosed. The method includes connecting inputs of a sensor to an oscillator arrangement. The sensor includes a first and a second measuring coil. The method includes further connecting outputs of the sensor to an analog-to-digital converter via a demodulator unit to obtain first and second digital measured values. The first and second digital measured values correspond to the distance between the profiled surface and the first and second measuring coil of the sensor, respectively. The method further includes connecting an arithmetic unit to the analog converter unit. The second measurement coil is arranged at a known distance from the first measuring coil on the side of the first measuring coil that faces away from the profiled surface. The method finally includes calculating, using the first and second digital measured value and a reference digital value and the fixed distance, a distance measured value giving the distance of the functional surface from the profiled surface. The reference digital value corresponding to the measured value from a reference coil. The reference coil is assigned to the first and second measuring coils and the reference coil is located outside the range of influence of the profiled surface.

16 Claims, 5 Drawing Sheets

U.S. PATENT DOCUMENTS

| | | | |
|---|---|---|---|
| 5,420,507 A * | 5/1995 | Laskowski | 324/236 |
| 5,432,444 A * | 7/1995 | Yasohama et al. | 324/240 |
| 5,764,050 A | 6/1998 | Ellmann et al. | |
| 5,926,020 A | 7/1999 | Samson | |
| 6,803,757 B2 * | 10/2004 | Slates | 324/207.17 |
| 2003/0098686 A1 | 5/2003 | Mednikov et al. | |

FOREIGN PATENT DOCUMENTS

| | | |
|---|---|---|
| DE | 695 13 302 T2 | 5/1996 |
| DE | 195 25 131 A1 | 1/1997 |
| DE | 101 41 764 A1 | 6/2002 |
| EP | 0 264 461 A1 | 4/1988 |

* cited by examiner

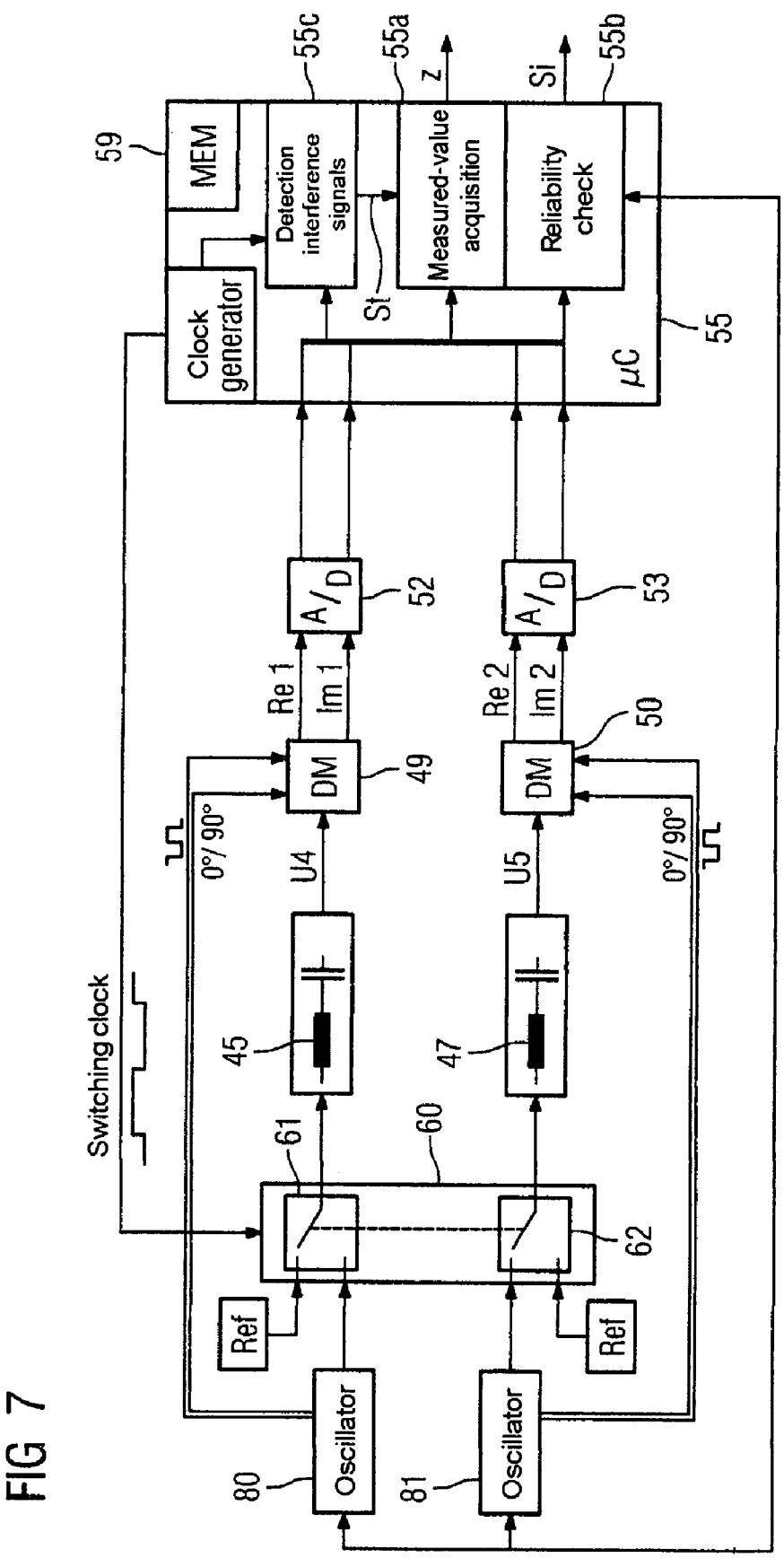

US 8,198,888 B2

METHOD AND SYSTEM FOR DETERMINING THE DISTANCE BETWEEN A PROFILED SURFACE AND A FUNCTIONAL SURFACE MOVING IN RELATION THERETO BY USING MEASUREMENT COILS AND A REFERENCE COIL

PRIORITY STATEMENT

This application is the national phase under 35 U.S.C. §371 of PCT International Application No. PCT/EP2005/054927 which has an International filing date of Sep. 29, 2005, which designated the United States of America and which claims priority on German Patent Application number 10 2004 049 753.2 filed Oct. 8, 2004, the entire contents of which are hereby incorporated herein by reference.

FIELD

Embodiments of the invention generally relate to a method for determining the distance between a conducting surface. For example, they may relate to a method for determining the distance between a conducting surface which is profiled in the direction of distance determination and referred to below as the profiled surface for clarity, and a functional surface moving relative to the profiled surface, using a measuring arrangement, in which a sensor having a first and a second measuring coil for generating an alternating electromagnetic field in each case is connected on its input side to an oscillator arrangement, and on its output side is connected by its outputs, which provide a first and second measurement corresponding to the distance between the profiled surface and the first and second measuring coil respectively, to an analog-to-digital converter unit via a demodulator unit in order to obtain first and second digital measured-values corresponding to the first and second measurements, and in which an arithmetic unit is connected to the analog converter unit.

BACKGROUND

German patent DE 195 25 131 C2 discloses a known method. In this known method, a sensor having two measuring coils is used, which are arranged immediately one after the other perpendicular to the conducting surface, and also offset from each other. In the known method, frequencies are applied to the input side of the two measuring coils from an oscillator in each case, where the oscillator frequencies differ from each other. Depending on the respective distance of the sensor from the conducting profiled surface, there is a resultant impedance change in the measuring coils that is detected by means of differential amplifiers connected to the output side of the measuring coils.

A demodulator unit comprising two demodulators and connected to the output of the differential amplifiers, and a circuit comprising two EPROMs connected to the output of the demodulator unit, are used to generate digital measured-values that correspond to the distance of the respective coil of the sensor from the conducting profiled surface. The digital measured-values are supplied to an arithmetic unit implemented in the form of a comparator and then examined there to evaluate whether the digital measured-values of the two measuring coils agree within a certain tolerance range. If this is the case, then the distance currently detected is deemed to be measured correctly, and an OK signal is generated by the arithmetic unit.

SUMMARY

At least one embodiment of the invention is directed to a method for determining the distance of a conducting surface, which is profiled in the direction of distance determination, from a functional surface moving relative to the profiled surface, in such a way that the distance determined by this method is independent of the profile of the conducting profiled surface as far as possible. If the profiled conducting surface is the surface of the long stator of a magnetic-levitation train system, then it is intended that the known method shall enable distance measurements that reduce the "groove-tooth" ripple i.e. changes in the impedance of the measuring coils when traveling over the teeth and grooves.

In a method of at least one embodiment, a sensor is used whose second measuring coil is arranged at a fixed, known distance from the first measuring coil on that side of the first measuring coil that faces away from the profiled surface, and the arithmetic unit uses the first and second digital measured-value and a reference digital value and the fixed distance to calculate a distance measured-value giving the distance of the functional surface from the profiled surface, where the reference digital value corresponds to the measured value from a reference coil assigned to the measuring coils and located outside the range of influence of the profiled surface.

The main advantage of the method according to at least one embodiment of the invention is that in the method, the effect of the profile of the profiled conducting surface on the measurement result is largely eliminated; in a magnetic-levitation train system, the groove-tooth ripple has a negligible effect on the measurement result. Another advantage is that it is also possible to compensate for distance measurement errors caused by temperature changes.

If, in the method according to at least one embodiment of the invention, a sensor having a linear characteristic is used, it is advantageous if the arithmetic unit determines a distance measured-value giving the distance of the functional surface from the profiled surface using the equation $$d = f\left(\frac{N1 - N3}{N2 - N1} \cdot a\right)$$

where N1 is the first digital measured-value, N2 is the second digital measured-value, N3 is the reference digital value, and a is the fixed distance between the measuring coils. The preferred idea here is to calculate the distance d directly using the product of the quotient given above and the fixed distance a.

If, however, in the method according to at least one embodiment of the invention, the sensor has a non-linear characteristic, then the distance is advantageously calculated using the equation $$d = \frac{\ln(N1) - \ln(N3)}{\ln(N2) - \ln(N1)} \cdot a$$

where N1 is the first digital measured-value, N2 is the second digital measured-value, N3 is the reference digital value, and a is the fixed distance.

In the method according to at least one embodiment of the invention, the reference digital value for determining the respective distance can be provided in a different manner. For instance, it may be advantageous if the reference digital value is obtained by means of a reference coil of the sensor, which is arranged adjacent to the measuring coils outside the range of influence of the surface.

It is considered particularly advantageous, however, if the reference digital value is stored in a memory of the arithmetic unit and is retrieved from the memory when determining the distance. The advantage in this case is that a separate reference coil can be dispensed with. In at least one embodiment of this embodiment, however, the reference digital value must be adjusted to account for the actual temperature.

In order to ensure that the measurement result, measured using the method according to at least one embodiment of the invention, is correct for the distance between the conducting surface and the moving functional surface, a first and a second digital distance measurement respectively is formed from the first and the second digital measured-value by conversion in the arithmetic unit, and the two digital distance measurements are compared with each other, obtaining a comparison value; a sensor reliability signal is generated by the arithmetic unit if a comparison value equals the fixed distance between the measuring coils. A certain tolerance range is advantageously allowed for the comparison value when generating the sensor reliability signal.

In order to increase further the measurement reliability when performing the method according to at least one embodiment of the invention, a changeover-switch unit is used to connect the input of the first measuring coil to a reference voltage, and to apply the oscillator frequency to the input of the second measuring coil in a first switch state, and in another switch state to connect the input of the second measuring coil to the reference voltage, and to apply the oscillator frequency to the input of the first measuring coil; the arithmetic unit determines an interference signal from the signals produced at the output of the analog converter unit in the different switch states. Interference, which could arise by operating a plurality of sensor systems next to each other, for example, can be eliminated by this.

The method according to at least one embodiment of the invention can be performed easily particularly advantageously if signals of identical frequency are applied to the two measuring coils by the oscillator arrangement, and if the signals of identical frequency are applied alternately in such a way that a signal is only applied to one measuring coil at a time. This not only keeps the cost of the oscillator arrangement low, but the measuring coils can have the same design as can any resonant circuits formed by them.

In the method according to at least one embodiment of the invention, differently designed oscillator arrangements can be used to output the signals of identical frequency. In this case it is considered advantageous if the oscillator arrangement has two oscillators that can be activated alternately.

It is also seen as advantageous if for an oscillator arrangement having two oscillators outputting two signals of identical frequency, the oscillators are alternately connected to their respective output-side measuring coils.

It is also extremely advantageous if for an oscillator arrangement having a single oscillator, the oscillator is alternately connected on its output side to the first or the second measuring coil, because in this case the oscillator arrangement manages with a single oscillator.

At least one embodiment of the invention also relates to a system for determining the distance of a conducting surface profiled in the direction of distance determination from a functional surface moving relative to the profiled surface, having a measuring arrangement, in which a sensor having a first and a second measuring coil for generating an alternating electromagnetic field in each case is connected on its input side to an oscillator arrangement, and on its output side is connected by its outputs, which provide a first and second measurement corresponding to the distance between the profiled surface and the first and second measuring coil respectively, to an analog-to-digital converter unit via a demodulator unit in order to obtain first and second digital measured-values corresponding to the first and second measurements, and in which an arithmetic unit is connected to the analog converter unit. Such a system is described in the German patent DE 195 25 131 C2 already discussed in detail above.

In at least one embodiment, this system may be further, developed so that a measurement of the distance of the profiled conducting surface from the functional surface can be made without being affected by the profile of the surface.

According to at least one embodiment of the invention, the second measuring coil of the sensor is arranged at a preset distance on that side of the first measuring coil that faces away from the profiled surface, and the arithmetic unit is designed to use the first and second digital measured-value and a reference digital value and the fixed distance to calculate a distance measured-value giving the distance of the functional surface from the profiled surface, where the reference digital value corresponds to the measured value from a reference coil assigned to the measuring coils and located outside the range of influence of the profiled surface.

The main advantage of the system according to at least one embodiment of the invention is that in the system, the effect of the profiling of the conducting profiled surface on the distance measurement for the functional surface moving relative to this profiled surface is eliminated as far as possible; in addition, temperature changes have a negligible effect on the measurement result.

The arithmetic unit can have a different design in the system according to at least one embodiment of the invention; it is seen as an advantageous embodiment when the arithmetic unit is designed so that it can determine the distance measured-value using the equation $$d = f\left(\frac{N1 - N3}{N2 - N1} \cdot a\right)$$

where N1 is the first digital measured-value, N2 is the second digital measured-value, N3 is a reference digital value, and "a" is the fixed distance, where the reference digital value corresponds to the measured value from a reference coil assigned to the measuring coils and located outside the range of influence of the profiled surface. Such a design of the arithmetic unit is always preferred when the sensor of the system according to at least one embodiment of the invention has an approximately linear characteristic.

If this is not the case, then in order to achieve a linearized characteristic it is considered advantageous if the arithmetic unit is designed so that it determines the distance using the equation $$d = \frac{\ln(N1) - \ln(N3)}{\ln(N2) - \ln(N1)} \cdot a$$

where N1 is the first digital measured-value, N2 is the second digital measured-value, N3 is a reference digital value, and a is the fixed distance, where the reference digital value corresponds to the measured value from a reference coil assigned to the measuring coils and located outside the range of influence of the profiled surface.

In the system according to at least one embodiment of the invention, a reference coil can actually be present. This reference coil must then be arranged in the sensor so that it is arranged on the sensor outside the range of influence of the profiled surface. The impedance of the reference coil is hence not affected by the conducting profiled surface, so the reference coil can be used to compensate for temperature effects on the distance measurement result.

In a particularly advantageous embodiment of the system according to the invention, a memory is assigned to the arithmetic unit, in which the reference digital value is stored. In this case, a reference coil is dispensed with and effectively a virtual reference coil is used. It must be remembered here, however, that the reference digital value must be adjusted to account for the actual temperature.

In the system according to at least one embodiment of the invention, the oscillator arrangement can have a different design. It is considered particularly advantageous if the oscillator arrangement includes two oscillators outputting signals of identical frequency, and the oscillators are connected via a changeover-switch unit to their respective output-side measuring coils in such a way that only one measuring coil at a time is connected to its input-side oscillator. Such an arrangement ensures that the measuring coils are decoupled from each other and cannot have a mutual influence causing an erroneous measurement result.

It can also be advantageous, however, if the oscillator arrangement has a single oscillator, and the oscillator is connected on the output side via a changeover switch to the two measuring coils in such a way that only one measuring coil at a time is connected to the oscillator. The particular advantage of this embodiment of the system according to the invention is that it manages with a single oscillator.

If the system according to at least one embodiment of the invention is equipped with a reference coil, then in order to achieve a system of minimum complexity it is considered advantageous if a multiplexer, clocked by the arithmetic unit, is arranged between the sensor and the demodulator unit.

In order to achieve particularly reliable measurement results, it is also considered advantageous if the oscillator arrangement outputs as signals of identical frequency sinusoidal voltages and two square-wave voltages mutually phase shifted by 90°, and the two square-wave voltages are applied to control inputs of two demodulators, each of which are arranged at the output of a measuring coil and form the demodulator unit.

It is also considered advantageous if the changeover-switch unit contains two synchronously operating changeover switches, and in one switch setting of the changeover-switch unit, the first measuring coil is connected to the oscillator via the one changeover switch, and simultaneously the second measuring coil is connected to a reference-voltage source via the other changeover switch, and in the other switch setting of the changeover-switch unit, the first measuring coil is connected to the reference-voltage source via the second changeover switch, and simultaneously the second measuring coil is connected to the oscillator. The advantage of this embodiment of the system according to the invention is that it enables elimination of external interference from outside influences or magnetic fields, for example from other sensors located nearby.

It is also considered advantageous if a first summing unit is arranged between the first measuring coil and the demodulator arranged on its output side, and a second summing unit is arranged between the second measuring coil and the demodulator arranged on its output side, and a phase shifter connected to the output of the first measuring coil is connected to the second summing unit, and a phase shifter connected to the output of the second measuring coil is connected to the first summing unit.

BRIEF DESCRIPTION OF THE DRAWINGS

Embodiments of the invention are explained in greater detail with reference to the figures, in which FIG. 7 shows an example embodiment having two oscillators and changeover switches.

DETAILED DESCRIPTION OF THE EXAMPLE EMBODIMENTS

Figure 1:
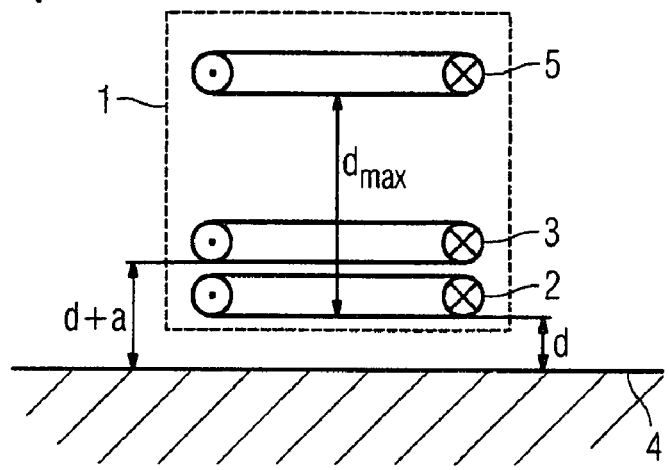
FIG. 1 shows schematically a sensor designed according to an embodiment of the invention in its position with respect to a profiled surface.

As can be seen in FIG. 1, the sensor 1 shown there includes a first measuring coil 2 and a second measuring coil 3. The two measuring coils have identical electrical characteristics, such as inductance and rating, when considered separately. The two measuring coils 2 and 3 are spaced apart by a preset distance a and arranged normal to a profiled conducting surface 4; the distance a is here substantially smaller than the measurement range used in determining the distance. The profiled surface can be formed by the surface of a stator of a magnetic-levitation train system; grooves and teeth in such a profiled surface 4 form the profile of this surface and run side-by-side in a direction normal to the drawing plane (in a manner not shown). A sensor 1 is connected (in a manner not shown) to a functional surface that can move relative to the profiled surface 4, this functional surface being formed in a magnetic-levitation train system by the "support magnet" of the magnetic-levitation train vehicle.

The sensor 1 is also provided with a reference coil 5, which is arranged outside the range of influence of the conducting profiled surface 4, i.e. is not affected by eddy current effects in the conducting profiled surface 4. The distance of the reference coil 5 from the first measuring coil equals, in the example embodiment shown, the maximum measuring range dmax of the distance d of the measuring coil 2 from the conducting profiled surface 4 that can be detected using the sensor 1 shown. The reference coil 5 has the same inductance and rating as the two measuring coils 2 and 3.

Figure 2:
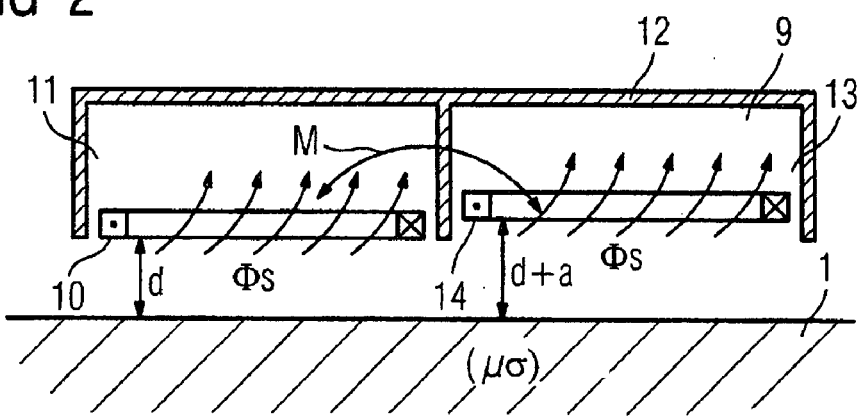
FIG. 2 shows a further example embodiment of a sensor according to the invention.

For the sensor 9 shown in FIG. 2, the first and second measuring coils are arranged differently. In this case, the first measuring coil 10 is housed in an area 11 of an enclosure 12, which is screened with respect to a second area 13. The second measuring coil 14 is housed in this second area 13, and in turn at a distance a with respect to the first measuring coil 10, where in this case the distance a can be less than the height of a measuring coil because the measuring coils 10 and are laterally offset from each other. In FIG. 2, "M" denotes the magnetic coupling between the two measuring coils, and "Φs" denotes the influence of an interference field, for example from a neighboring additional sensor.

Figure 3:
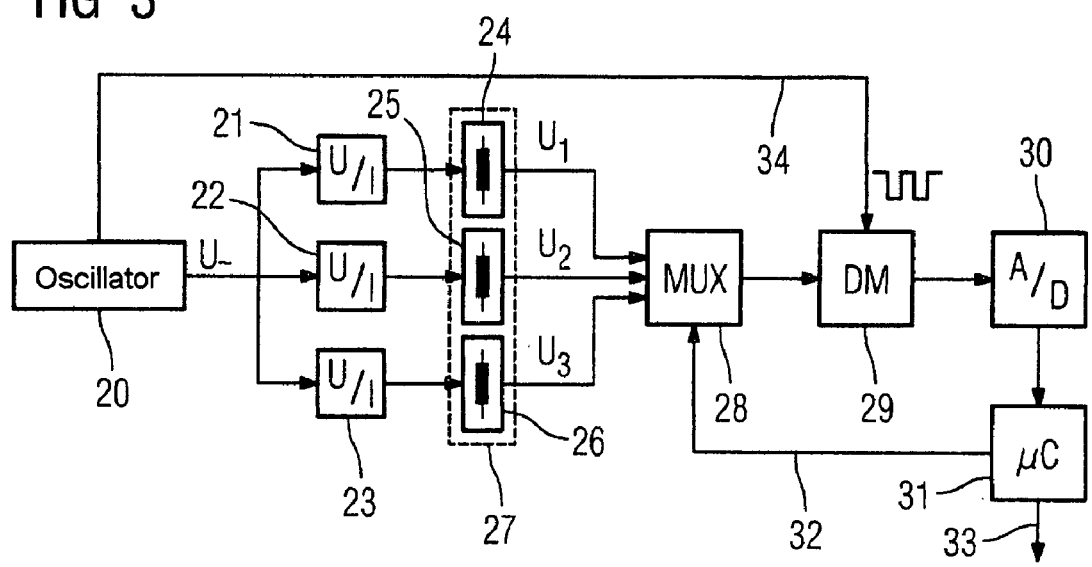
FIG. 3 shows an example embodiment of a measuring arrangement according to the invention having a reference coil.

FIG. 3 shows a measuring arrangement of the system according to an embodiment of the invention having an oscillator 20, to which are connected via a respective voltage-to-current converter 21, 22 and 23 a first measuring coil 24 (only shown schematically here), a second measuring coil 25 and a reference coil 26 of a sensor 27 otherwise not shown further.

The measuring coils 24 and 25 provide voltages U1 and U2 at their outputs commensurate with the changes in distance of the sensor 27 on a functional surface (not shown) from a profiled surface (also not shown), where the voltage U1 corresponds to the distance of the first measuring coil 24 from the conducting profiled surface (not shown here), and the voltage U2 corresponds to the distance of the second measuring coil 25 from the profiled surface, in accordance with the impedance changes of the two measuring coils. The voltage U3 from the reference coil 26 does not depend on the distance and is a measure of the actual temperature at the sensor 27.

The voltages U1 to U3 are applied to the inputs of a multiplexer 28, which is connected on the output side to a demodulator unit in the form of a demodulator 29. The output of the demodulator 29 is connected to an analog-to-digital converter 30 as an analog-to-digital converter unit, whose output is connected to an arithmetic unit 31 in the form of a microcontroller; the arithmetic unit 31 controls the multiplexer 28 via a connecting line 32. A distance measured-value Z, which corresponds to the distance d shown in FIGS. 1 and 2, is available at an output 33 of the arithmetic unit 31.

The measurement arrangement of FIG. 3 works in the manner that the respective voltages output one after the other from the multiplexer 28 to the demodulator 29 are each demodulated there by way of square-wave pulses supplied by the oscillator 20 via a line 34. The measurements appearing one after the other at the output of the demodulator 29 are converted in the analog-to-digital converter 30 into digital measured values N1 to N3.

N1 is here given by the equation $$N1 = Im(Zc) + k \cdot d$$

where $Im(Zc)$ is the imaginary component of the coupling impedance of the measuring coil 24, and k denotes a proportionality factor.

The digital measured-value N2 is calculated from the equation $$N2 = Im(Zc) + k \cdot d$$

where $Im(Zc)$ is the imaginary part of the coupling impedance of the second measuring coil 25, and k again denotes a proportionality factor.

The reference digital-value is given by $$N3 = Im(Zc)$$

where $Im(Zc)$ is the imaginary part of the impedance of the reference coil 26.

The coupling impedances Zc of the two measuring coils can advantageously be determined by the method described in the prior German patent application 103 32 761.4-52. The values N1 to N3 are then evaluated in the arithmetic unit 33, for example using an equation $$d = \frac{N1 - N3}{N2 - N1} \cdot a$$

where N1 are digital measured-values from the first measuring coil 24, N2 are digital measured-values from the second measuring coil 25, and N3 are reference digital-values from the reference coil 26, and where a is the constant, known distance (not shown in FIG. 3) between the first measuring coil 24 and the second measuring coil 25, as shown in FIG. 1 for example.

Figure 4:
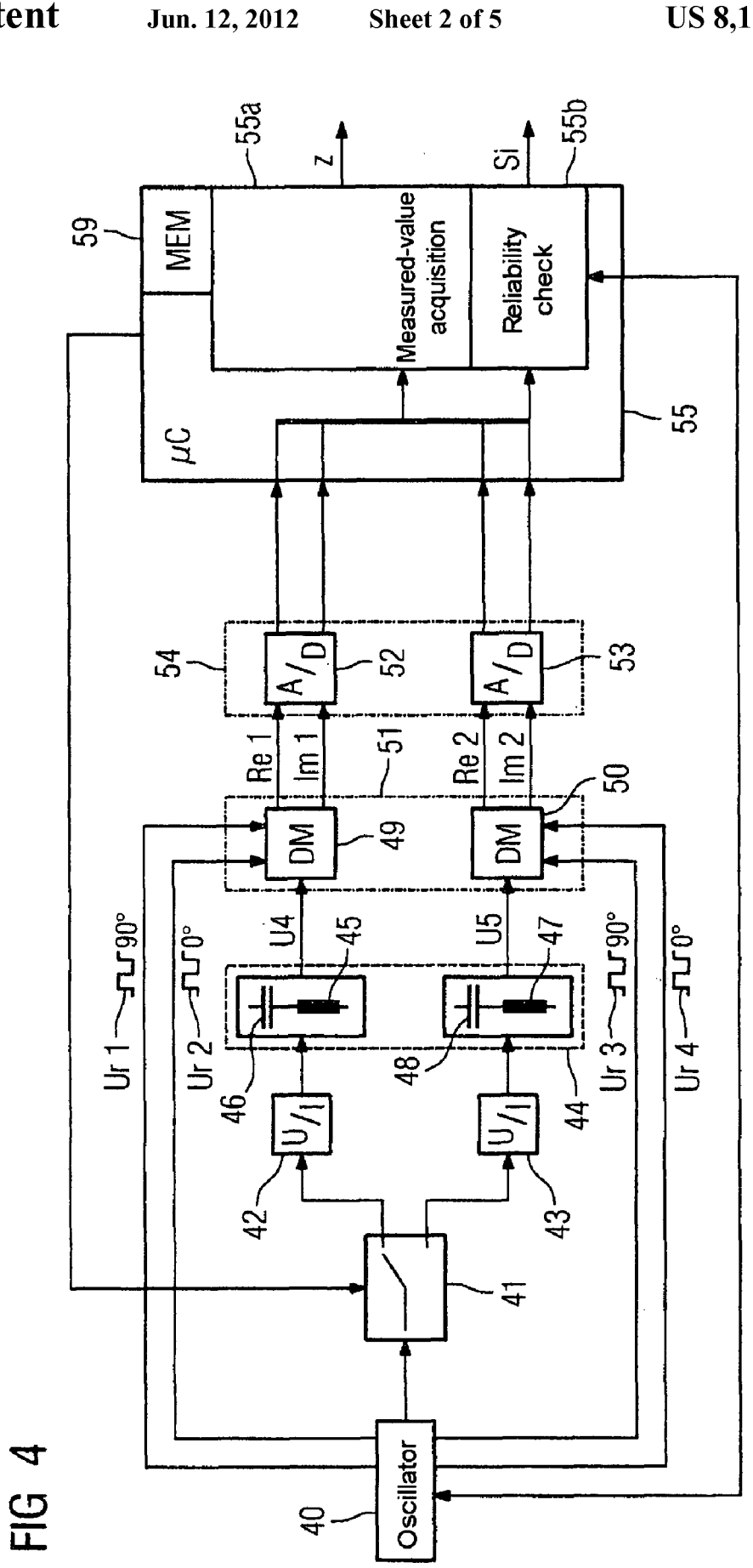
FIG. 4 shows another example embodiment of a measuring arrangement having a single oscillator and an output-side changeover switch.

The example embodiment shown in FIG. 4 of a measuring arrangement of the system according to the invention is essentially a two-channel design, which is initially implemented as a single channel, however, with a single oscillator 40 being provided, which is alternately connected to one voltage-to-current converter 42 or to another voltage-to-current converter 43 via a changeover-switch unit 41. A sensor 44 is arranged on the output side of the converters 42 and 43, and is connected in the manner that the output current of the converter 42 is applied to a first measuring coil 45 (only shown schematically here) in series with a capacitor 46 to form a resonant circuit. A second measuring coil 47 in series with another capacitor 48 forming a resonant circuit is arranged on the output side of the other voltage-to-current converter 43.

The voltages U4 and U5 occurring at the output of the sensor 44 are input respectively to a demodulator 49 and 50 of a demodulator unit 51. Two square-wave voltages Ur1 and Ur2, and respectively Ur3 and Ur4, mutually phase shifted by 90°, are applied by the oscillator 40 to each demodulator 49 and 50 respectively. Measurements corresponding to the real part Re1 and Re2 respectively and the imaginary part Im1 and Im2 respectively of the impedances of the first and second measuring coil 45 and 47 respectively are thus obtained at the outputs of the demodulators 49 and 50 in a known manner, said measurements being converted into digital measured-values in output-side analog-to-digital converters 52 and 53 of an analog-to-digital converter unit 54.

The digital measured-values N1 and N2 at the output of the analog-to-digital converters 52 and 53 are evaluated in an arithmetic unit 55 using the equation given above, and result in a distance measured-value Z at an output 54, which corresponds to the respective distance d (see FIG. 1 for example) of the functional surface from a profiled conducting surface. This is performed in a measured-value acquisition function 55a of the arithmetic unit 55, which is also provided with a memory 59 which holds a reference digital value corresponding to a virtual reference coil. A reference digital value N3 is retrieved from this memory 59. The reference digital value N3 can track the actual temperature of the measuring arrangement in a manner not shown by way of a temperature sensor having electronic circuitry connected to its output.

As FIG. 4 also shows, a reliability monitoring function 55b is provided in the arithmetic unit 55, which converts the digital measured-value N1 and N2 respectively from the first and second measuring coil 45 and 47 respectively into a separate distance measured-value in each case, and checks whether the difference between the determined distance measured-values equals the distance a within certain tolerances. If the difference lies within the tolerance limits, a signal Si is output by the arithmetic unit 55 indicating that the measurement is OK. In addition, the reliability monitoring function 55b checks that the oscillator 40 is working properly.

The changeover-switch unit 41 is clocked by the clock generator of the arithmetic unit 55.

In the measuring arrangement of FIG. 4, not only is the distance measured-value determined correctly and correct operation monitored, but the effect of coupling between the two measuring coils is eliminated by using the changeover-switch unit 41.

Figure 5:
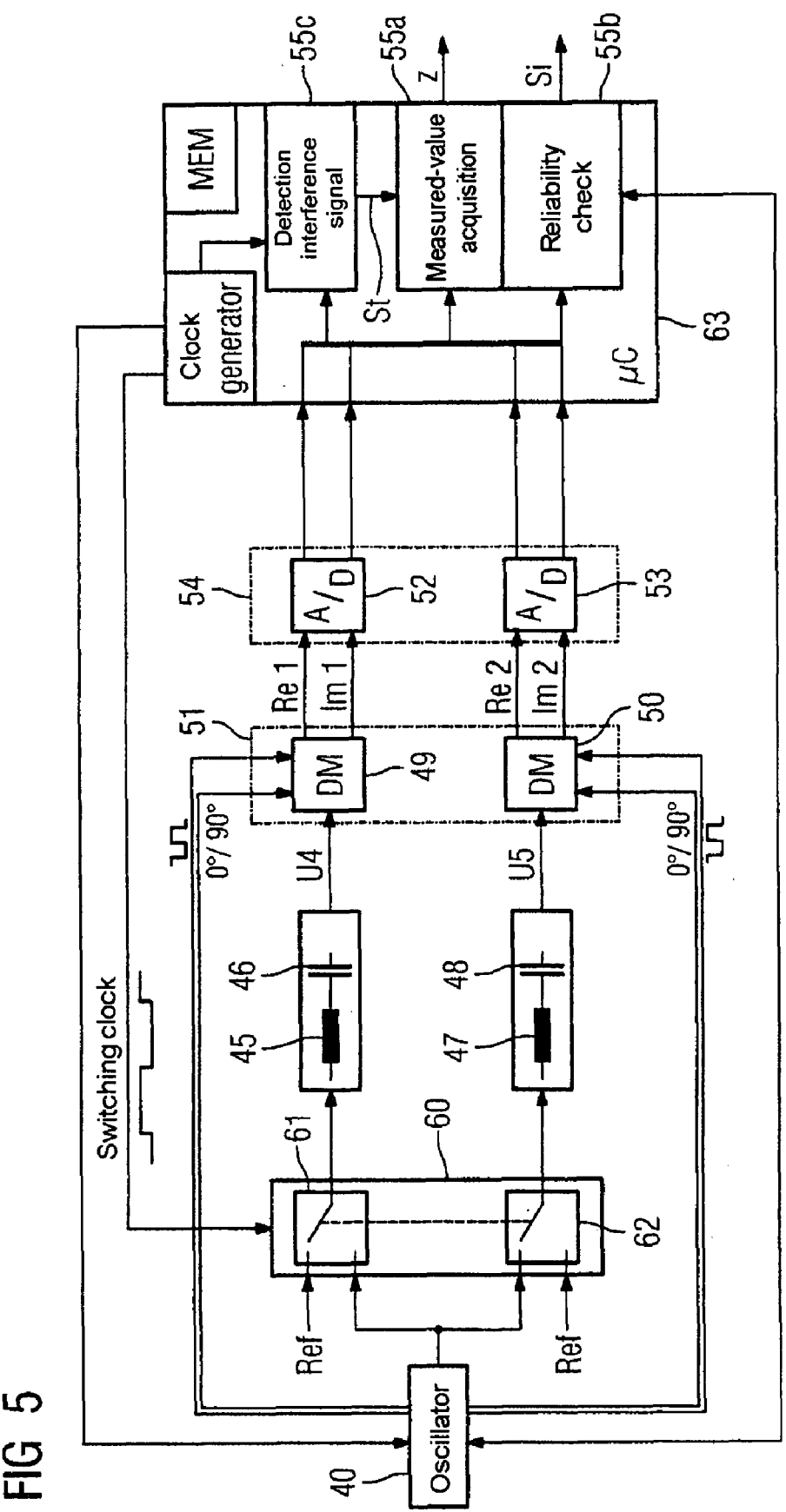
FIG. 5 shows an additional example embodiment having an oscillator and a changeover switch connected to reference voltages.

The measuring arrangement shown in FIG. 5 is largely identical to that shown in FIG. 4; reference is therefore made here initially to the description relating to FIG. 4, and parts in FIG. 5 that correspond to elements in FIG. 4 are thus given the same references.

The arrangement of FIG. 5 differs from that of FIG. 4 in that in FIG. 5 a changeover-switch unit 60 including two changeover switches 61 and 62 is used, by which, in one switch state, the first measuring coil 45 can be connected to a reference voltage Ref, and the second measuring coil 47 can be connected to the output of the oscillator 40. In a second switch setting of the changeover switches 61 and 62, the first measuring coil 45 is connected to the output of the oscillator 40, and the second measuring coil 47 is connected to the reference voltage Ref.

In the measuring arrangement of FIG. 5, if, for example, the reference voltage is applied to the first measuring coil 45, the interference environment of the first measuring coil 45 can be acquired. If the first measuring coil 45 is connected to the output of the oscillator 40, then a measured value is acquired that corresponds to the distance d (see FIG. 1 for example). The second measuring coil 47 works correspondingly, so that the arithmetic unit 63 can use the interference measured by the second measuring coil 47 to adjust the distance values measured at one point in time by the first measuring coil 45, for example, and in a function 55*c*, an interference signal St can be determined, which is then included in the measured-value acquisition function 55*a*.

Figure 6:
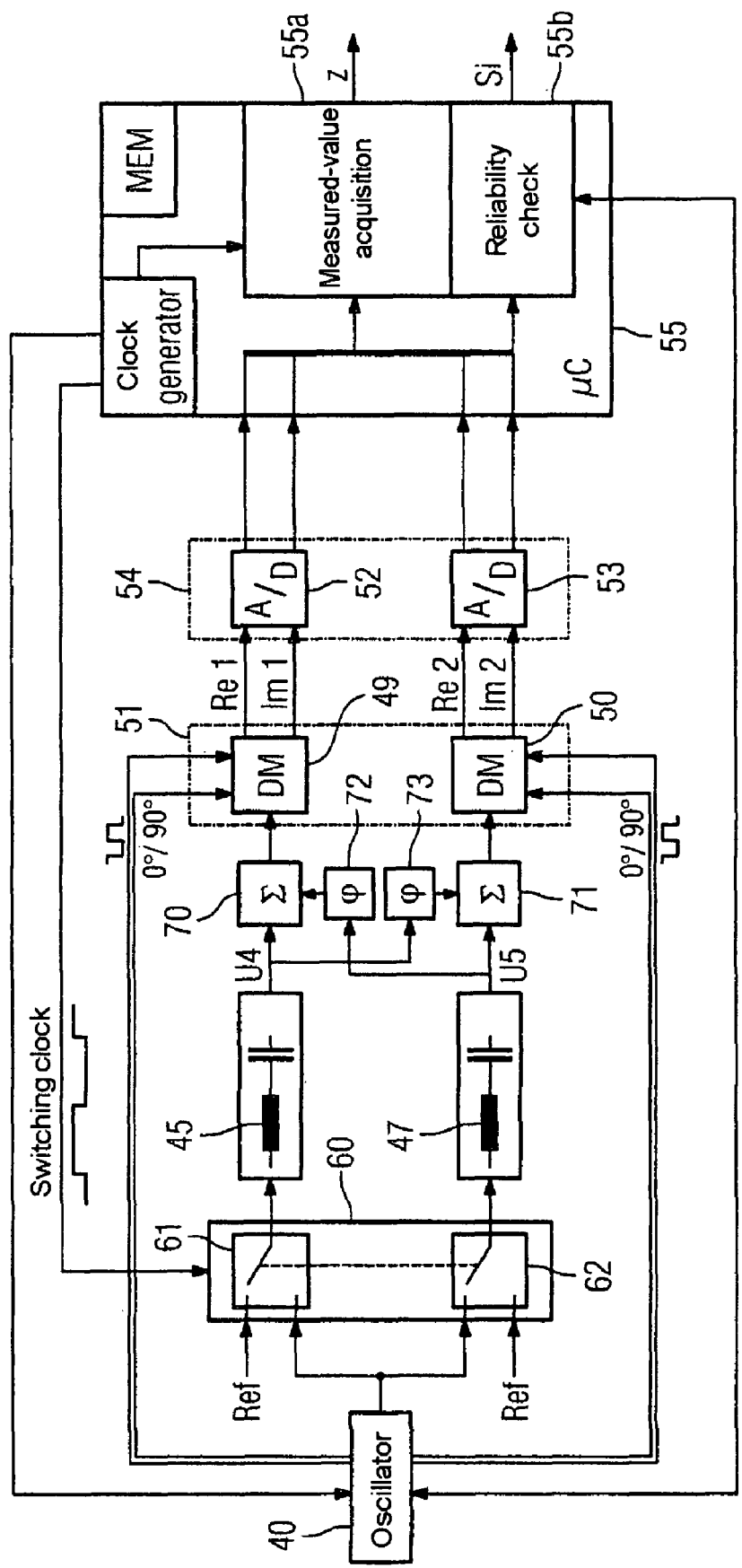
FIG. 6 shows another example embodiment having an oscillator and a changeover switch connected to reference voltages, and having interference signal compensation.

FIG. 6 shows another way of eliminating any interference that occurs. It shows a measuring arrangement similar to that of FIG. 5, so that again reference is made initially to the description of FIG. 5 for the sake of simplicity. The measuring arrangement of FIG. 6 differs from the embodiment shown in FIG. 5 in that the output of the measuring coils 45 and 47 is connected in each case to one input of a respective summing unit 70 and 71. A respective other input of the summing units 70 and 71 is connected via a phase shifter 72 and 73 respectively to the output of the respective other measuring coil 47 and 45 (not arranged directly in the input line) respectively. The interference is eliminated in the summing units 70 and 71, so that in this example embodiment, the measured values supplied to the demodulators 49 and 50 are free of interference and hence can be processed further as described in conjunction with FIG. 4.

The example embodiment shown in FIG. 7 is largely identical to that of FIG. 5; a single fundamental difference here is that two oscillators 80 and 81 are used, which are each connected separately to the changeover switches 61 and 62 of the changeover-switch unit 60. Otherwise it is identical to the measuring arrangement of FIG. 5.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for determining the distance of a conducting surface profiled in a direction of distance determination, from a functional surface moving relative to the profiled surface, using a measuring arrangement, the method comprising:
   connecting a sensor, including a first and a second measuring coil for generating an alternating electromagnetic field, on its input side to an oscillator arrangement, and connecting on its output side by its outputs, which provide a first and second measurement corresponding to the distance between the profiled surface and the first and second measuring coil respectively, to an analog-to-digital converter unit via a demodulator unit to obtain first and second digital measured values corresponding to the first and second measurement;
   connecting an arithmetic unit to the analog converter unit, wherein the sensor includes a second measuring coil arranged at a known distance from the first measuring coil on that side of the first measuring coil that faces away from the profiled surface; and
   calculating via the arithmetic unit, using the first and second digital measured value and a reference digital value and the fixed distance, a distance measured value giving the distance of the functional surface from the profiled surface, the reference digital value corresponding to the measured value from a reference coil assigned to the measuring coils and located outside the range of influence of the profiled surface, wherein the arithmetic unit is used to determine a distance measured-value d giving the distance of the functional surface from the profiled surface using the equation $$d = f\left(\frac{N1 - N3}{N2 - N1} \cdot a\right)$$

where N1 is the first digital measured-value, N2 is the second digital measured-value, N3 is the reference digital value, and a is the fixed distance.

2. The method as claimed in claim 1, wherein the reference digital value is obtained by way of the reference coil of the sensor, said reference coil being located adjacent to the measuring coils outside the range of influence of the profiled surface.

3. The method as claimed in claim 1, wherein the reference digital value is stored in a memory of the arithmetic unit and is retrieved from the memory when determining the distance.

4. A method for determining the distance of a conducting surface profiled in a direction of distance determination, from a functional surface moving relative to the profiled surface, using a measuring arrangement, the method comprising:
   connecting a sensor, including a first and a second measuring coil for generating an alternating electromagnetic field, on its input side to an oscillator arrangement, and connecting on its output side by its outputs, which provide a first and second measurement corresponding to the distance between the profiled surface and the first and second measuring coil respectively, to an analog-to-digital converter unit via a demodulator unit to obtain first and second digital measured values corresponding to the first and second measurement;
   connecting an arithmetic unit to the analog converter unit, wherein the sensor includes a second measuring coil arranged at a known distance from the first measuring coil on that side of the first measuring coil that faces away from the profiled surface; and
   calculating via the arithmetic unit, using the first and second digital measured value and a reference digital value and the fixed distance, a distance measured value giving the distance of the functional surface from the profiled surface, the reference digital value corresponding to the measured value from a reference coil assigned to the measuring coils and located outside the range of influence of the profiled surface, wherein the distance d is advantageously calculated using the equation $$d = \frac{\ln(N1) - \ln(N3)}{\ln(N2) - \ln(N1)} \cdot a$$

where N1 is the first digital measured-value, N2 is the second digital measured-value, N3 is the reference digital value, and a is the fixed distance.

5. The method as claimed in claim 4, wherein the reference digital value is obtained by way of the reference coil of the sensor, said reference coil being located adjacent to the measuring coils outside the range of influence of the profiled surface.

6. The method as claimed in claim 4, wherein the reference digital value is stored in a memory of the arithmetic unit and is retrieved from the memory when determining the distance.

7. A method for determining the distance of a conducting surface profiled in a direction of distance determination, from a functional surface moving relative to the profiled surface, using a measuring arrangement, the method comprising:
connecting a sensor, including a first and a second measuring coil for generating an alternating electromagnetic field, on its input side to an oscillator arrangement, and connecting on its output side by its outputs, which provide a first and second measurement corresponding to the distance between the profiled surface and the first and second measuring coil respectively, to an analog-to-digital converter unit via a demodulator unit to obtain first and second digital measured values corresponding to the first and second measurement;
connecting an arithmetic unit to the analog converter unit, wherein the sensor includes a second measuring coil arranged at a known distance from the first measuring coil on that side of the first measuring coil that faces away from the profiled surface; and
calculating via the arithmetic unit, using the first and second digital measured value and a reference digital value and the fixed distance, a distance measured value giving the distance of the functional surface from the profiled surface, the reference digital value corresponding to the measured value from a reference coil assigned to the measuring coils and located outside the range of influence of the profiled surface, wherein a changeover-switch unit is used to connect the input of the first measuring coil to a reference voltage, and to apply the oscillator frequency to the input of the second measuring coil in a first switch state, and in another switch state to connect the input of the second measuring coil to the reference voltage, and to apply the oscillator frequency to the input of the first measuring coil, and the arithmetic unit is used to determine an interference signal from the signals produced at the output of the analog converter unit.

8. A system for determining the distance of a conducting surface, profiled in a direction of distance determination, from a functional surface moving relative to the profiled surface, having a measuring arrangement, the system comprising:
a sensor, including a first and a second measuring coil to generate an alternating electromagnetic field, connected on its input side to an oscillator arrangement, and connected on its output side by its outputs, which provide a first and second measurement corresponding to the distance between the profiled surface and the first and second measuring coil respectively, to an analog-to-digital converter unit via a demodulator unit to obtain first and second digital measured-values corresponding to the first and second measurements; and
an arithmetic unit, connected to the analog converter unit, the second measuring coil of the sensor being arranged at a preset distance on that side of the first measuring coil that faces away from the profiled surface, and the arithmetic unit being designed to use the first and second digital measured-value and a reference digital value and the fixed distance to calculate a distance measured-value giving the distance of the functional surface from the profiled surface, the reference digital value corresponding to the measured value from a reference coil assigned to the measuring coils and located outside the range of influence of the profiled surface, the arithmetic unit being designed to determine the distance measured-value d using the equation $$d = f\left(\frac{N1 - N3}{N2 - N1} \cdot a\right)$$

where N1 is the first digital measured-value, N2 is the second digital measured-value, N3 is a reference digital value, and a is the fixed distance, where the reference digital value corresponds to the measured value from a reference coil assigned to the measuring coils and located outside the range of influence of the profiled surface.

9. The system as claimed in claim 8, wherein the reference coil is arranged on the sensor outside the range of influence of the profiled surface.

10. A system for determining the distance of a conducting surface, profiled in a direction of distance determination, from a functional surface moving relative to the profiled surface, having a measuring arrangement, the system comprising:
a sensor, including a first and a second measuring coil to generate an alternating electromagnetic field, connected on its input side to an oscillator arrangement, and connected on its output side by its outputs, which provide a first and second measurement corresponding to the distance between the profiled surface and the first and second measuring coil respectively, to an analog-to-digital converter unit via a demodulator unit to obtain first and second digital measured-values corresponding to the first and second measurements; and
an arithmetic unit, connected to the analog converter unit, the second measuring coil of the sensor being arranged at a preset distance on that side of the first measuring coil that faces away from the profiled surface, and the arithmetic unit being designed to use the first and second digital measured-value and a reference digital value and the fixed distance to calculate a distance measured-value giving the distance of the functional surface from the profiled surface, the reference digital value corresponding to the measured value from a reference coil assigned to the measuring coils and located outside the range of influence of the profiled surface, wherein the arithmetic unit is designed to determine the distance d using the equation $$d = \frac{\ln(N1) - \ln(N3)}{\ln(N2) - \ln(N1)} \cdot a$$

where N1 is the first digital measured-value, N2 is the second digital measured-value, N3 is a reference digital value, and a is the fixed distance, where the reference digital value corresponds to the measured value from a reference coil from the profiled surface assigned to the measuring coils and located outside the range of influence of the profiled surface.

11. The system as claimed in claim 10, wherein the reference coil is arranged on the sensor outside the range of influence of the profiled surface.

12. A system for determining the distance of a conducting surface, profiled in a direction of distance determination, from a functional surface moving relative to the profiled surface, having a measuring arrangement, the system comprising:
- a sensor, including a first and a second measuring coil to generate an alternating electromagnetic field, connected on its input side to an oscillator arrangement, and connected on its output side by its outputs, which provide a first and second measurement corresponding to the distance between the profiled surface and the first and second measuring coil respectively, to an analog-to-digital converter unit via a demodulator unit to obtain first and second digital measured-values corresponding to the first and second measurements; and
- an arithmetic unit, connected to the analog converter unit, the second measuring coil of the sensor being arranged at a preset distance on that side of the first measuring coil that faces away from the profiled surface, and the arithmetic unit being designed to use the first and second digital measured-value and a reference digital value and the fixed distance to calculate a distance measured-value giving the distance of the functional surface from the profiled surface, the reference digital value corresponding to the measured value from a reference coil assigned to the measuring coils and located outside the range of influence of the profiled surface; and
- a multiplexer, clocked by the arithmetic unit, arranged between the sensor and the demodulator unit, wherein the reference coil is arranged on the sensor outside the range of influence of the profiled surface.

13. A system for determining the distance of a conducting surface, profiled in a direction of distance determination, from a functional surface moving relative to the profiled surface, having a measuring arrangement, the system comprising:
- a sensor, including a first and a second measuring coil to generate an alternating electromagnetic field, connected on its input side to an oscillator arrangement, and connected on its output side by its outputs, which provide a first and second measurement corresponding to the distance between the profiled surface and the first and second measuring coil respectively, to an analog-to-digital converter unit via a demodulator unit to obtain first and second digital measured-values corresponding to the first and second measurements; and
- an arithmetic unit, connected to the analog converter unit, the second measuring coil of the sensor being arranged at a preset distance on that side of the first measuring coil that faces away from the profiled surface, and the arithmetic unit being designed to use the first and second digital measured-value and a reference digital value and the fixed distance to calculate a distance measured-value giving the distance of the functional surface from the profiled surface, the reference digital value corresponding to the measured value from a reference coil assigned to the measuring coils and located outside the range of influence of the profiled surface, wherein the oscillator arrangement outputs as signals of identical frequency sinusoidal voltages and a respective pair of two square-wave voltages mutually phase shifted by 90°, and the square-wave voltages are applied to control inputs of two demodulators, each of which are arranged at the output of a measuring coil and form the demodulator unit.

14. The system as claimed in claim 13, wherein a first summing unit is arranged between the first measuring coil and the demodulator arranged on its output side, and a second summing unit is arranged between the second measuring coil and the demodulator arranged on its output side, and a phase shifter connected to the output of the first measuring coil is connected to the second summing unit, and a phase shifter connected to the output of the second measuring coil is connected to the first summing unit.

15. A system for determining the distance of a conducting surface, profiled in a direction of distance determination, from a functional surface moving relative to the profiled surface, having a measuring arrangement, the system comprising:
- a sensor, including a first and a second measuring coil to generate an alternating electromagnetic field, connected on its input side to an oscillator arrangement, and connected on its output side by its outputs, which provide a first and second measurement corresponding to the distance between the profiled surface and the first and second measuring coil respectively, to an analog-to-digital converter unit via a demodulator unit to obtain first and second digital measured-values corresponding to the first and second measurements; and
- an arithmetic unit, connected to the analog converter unit, the second measuring coil of the sensor being arranged at a preset distance on that side of the first measuring coil that faces away from the profiled surface, and the arithmetic unit being designed to use the first and second digital measured-value and a reference digital value and the fixed distance to calculate a distance measured-value giving the distance of the functional surface from the profiled surface, the reference digital value corresponding to the measured value from a reference coil assigned to the measuring coils and located outside the range of influence of the profiled surface, wherein,
  - the changeover-switch unit contains two synchronously operating changeover switches, and in one switch setting of the changeover-switch unit,
  - the first measuring coil is connected to the oscillator via the one changeover switch, and simultaneously the second measuring coil is connected to a reference-voltage source via the other changeover switch, and in the other switch setting of the changeover-switch unit,
  - the first measuring coil is connected to the reference-voltage source, and simultaneously the second measuring coil is connected to the oscillator, and
  - the oscillator arrangement comprises two oscillators outputting signals of identical frequency, and the oscillators are connected via a changeover-switch unit to their respective output-side measuring coils in such a way that only one measuring coil at a time is connected to its input-side oscillator.

16. The system as claimed in claim 15, wherein a first summing unit is arranged between the first measuring coil and the demodulator arranged on its output side, and a second summing unit is arranged between the second measuring coil and the demodulator arranged on its output side, and a phase shifter connected to the output of the first measuring coil is connected to the second summing unit, and a phase shifter connected to the output of the second measuring coil is connected to the first summing unit.

* * * * *